United States Patent Office 3,428,628
Patented Feb. 18, 1969

3,428,628
CERTAIN CYCLOALKYLAMINE SUBSTITUTED BIS - TRIAZINYLAMINO STILBENE COMPOUNDS
Christopher Johannes Tscharner, Warwick, R.I., assignor to Geigy Chemical Corporation, Greenburgh, N.Y., a corporation of Delaware
No Drawing. Filed June 23, 1965, Ser. No. 466,453
U.S. Cl. 260—240
Int. Cl. C09b 23/10; D06l 3/12
9 Claims

ABSTRACT OF THE DISCLOSURE

Bis-triazinylamino stilbene compounds of the formula:

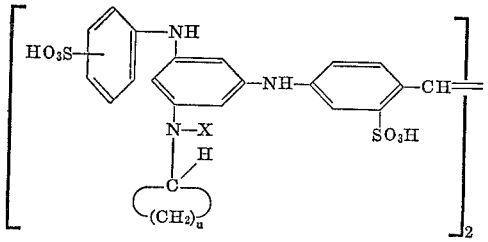

in which $u$ has a value of 4 to 5, and in which X represents $-(CH_2)_n-OH$ where $n$ has a value of 2 to 4; or

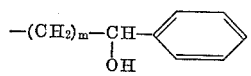

where $m$ has a value of 1 to 3, and salts thereof, are optical brightening agents useful for the brightening of paper and textile products. The compounds are particularly useful in application from solutions of low pH. The compounds maintain their brightening effect under severe pH conditions which ordinarily would destroy the brightening properties of known optical brighteners as well as causing "greening" effects. A particularly preferred compound is tetrasodium-4,4'-bis{[<4[4-sulfoanilino]-6-[N-2 - hydroxyethyl - N - cyclohexyl-amino]-1,3,5-triazin-2-Y1>]-amino}-stilbene-2,2'-disulfonate.

---

This invention relates to new bis-triazinylamino stilbene compounds and to their use as optical brighteners.
More specifically, this invention pertains to bistriazinylamino stilbene compounds of the general formula:

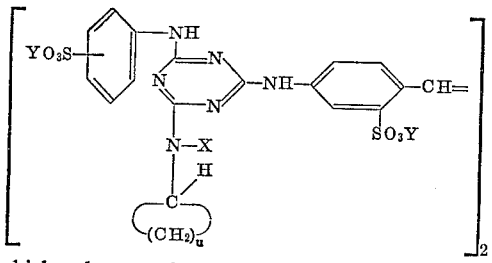

in which $u$ has a value of 4 to 5, and in which X represents (a) $-(CH_2)_n-OH$ where $n$ has a value of 2 to 4; viz., 2 - hydroxyethyl, 3 - hydroxypropyl, 4 - hydroxybutyl, and
(b)

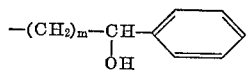

where $m$ has a value of 1 to 3; viz., 2-hydroxy-2-phenylethyl, 3-hydroxy-3-phenylpropyl, and 4-hydroxy-4-phenylbutyl, and in which
Y stands for hydrogen, alkaline and alkaline earth metal cations, and cations derived from ammonia and alkanolamines of the formula:

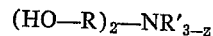

in which R is an alkane radical of 2–4 carbon atoms R' is selected from among hydrogen, methyl, and ethyl, and in which z has a value of 1 to 3.

Optical brighteners of the bis-triazinylamino stilbene type are finding increasingly wider application in the textile, paper, and detergent industries. The increased brightness, which results from incorporating realtively minor amounts of such brighteners into paper, textiles, detergents and the like, enhances the appearance and, consequently, the marketable value of the finished products.

Optical brighteners improve the appearance of these products by neutralizing the familiar yellow tinge that is usually apparent in untreated products of the type mentioned. This yellow tinge is caused by the absorption of short wavelength light. Optical brighteners neutralize the yellow tinge resulting therefrom by absorbing invisible ultraviolet radiation and emitting the energy thereof in the form of visible blue to blue-violet light. The fluorescent properties of the optical brighteners of this invention are strikingly apparent under ultraviolet light in darkroom conditions.

Some previously known optical brighteners of the diamino stilbene triazine type have had the disadvantage of being adversely affected under lower pH conditions (4–5). Such acidic conditions are often encountered for instance, in the papermaking industry. Not only do such known compounds fail to exhibit their full fluorescence under acidic conditions but many forms precipitates in the aqueous solution under severely acid conditions. In addition, many prior art brighteners require the use of a co-solvent to form aqueous concentrates which adds to the cost and inconvenience of handling.

The substituted diamino stilbene triazine compounds of this invention are excellent optical brighteners. They are particularly advantageous in that they may very successfully be applied over a wide pH range. Even at pH's as low as 4.5 there is no undesirable discoloration as with many brighteners currently on the market.

In general the compounds of this invention may be prepared by first reacting one mole of a cyanuric halide with one mole of sulfanilic acid. The product of this reaction is reacted in turn with one mole of 4,4'-diaminostilbene-2',2-disulfonic acid. The resultant intermediate product is then reacted with the appropriate cycloalkylamine. The reaction mixture is then neutralized, generally in caustic, or sodium carbonate, or a tertiary amine. The acid form of the compounds may be isolated if desired, but the compounds are generally employed in their salt form in liquid solutions.

In the case of compounds of the above formula wherein X is $-(CH_2)_m-OH$, which constitute the preferred embodiment of the present invention it has been found that a co-solvent is not required to form stable aqueous solutions of the brightener. Another reason that these compounds are preferred is that they exhibit excellent exhaust and build up characteristics.

To prepare stable aqueous formulations from compounds of the above formula wherein X is

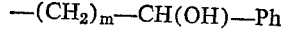

a co-solvent is preferably used. In such cases suitable solvents which may be employed are polyethylene glycols, cellosolves, carbitols.

Representative of such solvents are polyethylene glycols of the formula $H(OCH_3CH_2)_v$ wherein $v$ has a value of 4 to 6, diethyleneglycolethylether, diethyleneglycolpropyl ether, diethyleneglycolbutylether, methoxyethanol, 2-ethoxybutanol, 2-propoxyethanol, 2-butoxyethanol.

Also useful are amino compounds such as, mono-, di-, and triethanolamines; mono-, di-, and tributanol amines derived from 1-butanol, 2-butanol, or 1-methyl-2-propanol; N - methyl-diethanolamine; N,N - dimethylethanolamine; and N,N-diethylethanolamine. The preferred amine is triethanolamine.

Dipolar aprotic solvents such as dimethyl formamide may also be used.

Aqueous formulations of the brightener agents of this invention commonly contain from 10 to 30% by weight of brightener compound. Such concentrates are readily dilutable with water to the desired concentration for application to products to be treated such as cellulose, polyamide, and proteinacious fibers, and other substrates that have greatly improved bright appearance by the action of optical brighteners of this invention.

The following examples of certain specific embodiments will further serve to illustrate the nature of my invention. Parts are by weight; temperatures are given in degrees centigrade unless otherwise indicated.

EXAMPLE I

To an acetone-water-ice mixture containing 41.2 parts of cyanuric chloride 38.4 parts of sulfanilic acid was added. The temperature was maintained at 0–5° C. and the pH adjusted to neutral with sodium carbonate. The resulting intermediate is then reacted with 40 parts of 4,4'-amino-stilbene-2,2'-disulfonic acid at 10–50° C. The pH is again adjusted to neutral with sodium carbonate. The intermediate formed is then reacted with 37.6 parts of N-(2-hydroxyethyl)-cyclohexylamine at 50–98° C. The pH is adjusted with caustic and the mixture evaporated to dryness. 160 parts of tetrasodium-4,4'-bis{[<4[4-sulfoanilino]-6-[N-2-hydroxyethyl - N - cyclohexyl-amino]-1,3,5-triazin-2-Yl>]-amino}-stilbene - 2-2'-disulfonate were obtained. The product exhibits U.V. absorption in the 345–365 mμ range.

EXAMPLE II

The procedure of Example I is repeated except that metanilic acid is substituted in place of sulfanilic acid. 159 parts of tetrasodium-4,4'-bis{[<4-[3-sulfoanilino]-6-[N-2-hydroxyethyl - N - cyclohexyl-amino]-1,3,5-triazin-2-Yl>]-amino}-stilbene-2,2'-disulfonate are obtained.

EXAMPLE III (a) To the intermediate obtained with the addition of 4,4'-amino-stilbene-2,2'-disulfonic acid in Example I there is added 44.9 parts of N-(4-hydroxybutyl)-cyclohexylamine and the mixture reacted at 50–98° C. 167 parts of tetrasodium-4,4'-bis{[<4 - [4 - sulfoanilino]-6-[N-4-hydroxybutyl-N-cyclohexyl-amino] - 1,3,5 - triazin-2-Yl>]-amino}-stilbene-2,2'-disulfonate are obtained.

(b) If N-[3-hydroxypropyl]-cyclohexylamine is employed the product obtained is tetrasodium-4,4'-bis{[<4-[4-sulfoanilino] - 6 - [N-3-hydroxypropyl-N-cyclohexyl-amino]-1,3,5-triazin - 2 - Yl>]-amino}-stilbene-2,2'-disulfonate.

EXAMPLE IV (a) To the intermediate obtained with the addition of 4,4'-amino-stilbene-2,2'-disulfonic acid in Example I, there is added 54.5 parts of N-(2-hydroxy-2-phenylethyl)-cyclohexyl-amine, and the mixture reacted at 50–98° C. 176 parts of tetrasodium-4,4'-bis-{[<4-[4-sulfoanilino]-6-[2-hydroxy - 2 - phenyl-ethyl-N-cyclohexylamino]-1,3,5-triazin-2-Yl>]-amino}-stilbene-2,2'-disulfonate are obtained.

(b) If N-[3-hydroxy - 3 - phenylpropyl]-cyclohexylamine is employed the product obtained is tetrasodium-4,4'-bis-{[<4-[4-sulfoanilino] - 6 - [3-hydroxy-3-phenylpropyl - N - cyclohexylamino] - 1,3,5 - triazin-2-Yl>]-amino}-stilbene-2,2'-disulfonate.

(c) Likewise if N - [4 - hydroxy-4-phenyl-butyl]-cyclohexylamine are employed the product obtained is tetrasodium - 4,4'-bis - {[<4-[4-sulfoanilino] - 6 - [4-hydroxy-4 - phenylbutyl - N - cyclohexylamino] - 1,3,5 - triazin - 2 - Yl>]-amino}-stilbene-2,2'-disulfonate.

EXAMPLE V

The procedure of Example I is repeated to the point including the reaction product formed by the addition of N-(2-hydroxyethyl)-cyclohexylamine. Instead of caustic, triethanolamine is employed to neutralize the reaction mass and the mixture is evaporated to dryness. 225 parts of the corresponding amine salt are obtained.

EXAMPLE VI

N-methyldiethanolamine is employed in the same manner as the triethanolamine of Example V and yields 208 parts of the corresponding salt.

EXAMPLE VII

Corresponding amine salt compounds are obtained when the amines used in Examples V through VI are reacted with the acid form of the products of Examples II and IV.

EXAMPLE VIII

In the above examples cyclopentylamine compounds are used in place of cyclohexylamine compounds corresponding cyclopentylamino compounds are obtained viz.:

In Example I: Tetrasodium - 4,4'-bis{[<4-[4-sulfoanilino] - 6 - [N - 2 - hydroxyethyl - N - cyclopentyl - amino]-1,3,5-triazin-2-Yl>]-amino}-stilbene-2,2'-disulfonate.

In Example II: Tetrasodium - 4,4'-bis{[<4-[3-sulfoanilino] - 6 - [N - 2 - hydroxyethyl - N - cyclopentyl-amino]-1,3,5-triazin-2-Yl>]-amino}-stilbene-2,2'-disulfonate.

In Example IIIa: Tetrasodium-4,4'-bis{[<4-[4-sulfoanilino] - 6 - [N - 4 - hydroxybutyl - N - cyclopentyl - amino]-1,3,5-triazin-2-Yl>]-amino}-stilbene-2,2'-disulfonate.

In Example IIIb: Tetrasodium-4,4'-bis{[<4-[4-sulfoanilino]-6-[N - 3 - hydroxypropyl - N - cyclopentyl - amino]-1,3,5-triazin-2-Yl>]-amino}-stilbene-2,2'-disulfonate.

In Example IVa: Tetrasodium-4,4'-bis{[<4-[4-sulfoanilino] - 6 - [2 - hydroxy - 2 - phenylethyl - N - cyclopentyl-amino] - 1,3,5 - triazin - 2 - Yl>] - amino} - stilbene - 2,2'-disulfonate.

In Example IVb: Tetrasodium-4,4'-bis{[<4-[4-sulfoanilino] - 6 - [3 - hydroxy - 3 - phenylpropyl - N - cyclopentyl-amino] - 1,3,5 - triazin - 2 - Yl>] - amino} - stilbene - 2,2'-disulfonate.

In Example IVc: Tetrasodium-4,4'-bis{[<4-[4-sulfoanilino] - 6 - [4 - hydroxy - 4 - phenylbutyl - N - cyclopentyl-amino] - 1,3,5 - triazin - 2 - Yl>] - amino} - stilbene - 2,2'-disulfonate.

EXAMPLE IX

A white water beater mixture is prepared using 4.0 grams of bleached sulfite pulp by slurrying in 200 ml. of water containing 2% brightener of Example I and the mixture agitated for ten minutes at room temperature. 1.5% rosin size is added and the mixture agitated for an additional ten minutes. 2.5% alum (17% assay $Al_2O_3$) is added and agitation continued for another ten minutes. The slurry is diluted to 0.4% of optical brightener agent with 360 mg./liter of alum (17% assay $Al_2O_3$). The diluted slurry is sheeted, compressed, and dried. A clear, bright, white sheet with no yellow tinge is obtained. Similar results are obtained using the brightening agent of Example IV.

EXAMPLE X

An 8% starch, 1% brightener of Example V solution is prepared and is applied to a paper sheet at 160° F. by passing the sheet through an immersion trough, then through squeeze rollers. The pH of the starch solution had previously been adjusted to 4.0 with alum. The thus treated sheet is extremely bright with no evidence of yellowing or greening effect even at the low pH employed.

EXAMPLE XI

The procedure of Example IX is repeated except that the optical brightening agent is added after the alum, the mixture agitated for ten minutes, and sheeted. Again clear white sheets of greatly improved appearance over control sheets not so treated were obtained.

EXAMPLE XII

A resin pad bath containing four pounds of the optical brightener of Example I, 80 pounds resin, and 8 pounds acid catalyst in 100 gallons of water is applied to cotton fiber, dried, and cured at 325° F. for two minutes. The fiber exhibited a very bright white.

EXAMPLE XIII

The bath of Example XII is titrated with 0.05% of N HCl to a point where it becomes unusable due to precipitation at a pH of 2.5 to 2.7.

EXAMPLE XIV

The brightener of Example I when applied to polyamide fiber and proteinaceous fibers such as wool under both neutral and acidic conditions enhanced the bright appearance of these fibers over untreated control fibers.

While the invention has been explained by detailed description of certain specific embodiments, it is understood that various modifications and substitutions can be made in any of them within the scope of the appended claims which are intended also to include equivalents of such embodiments.

What is claimed is:

1. A compound having the formula:

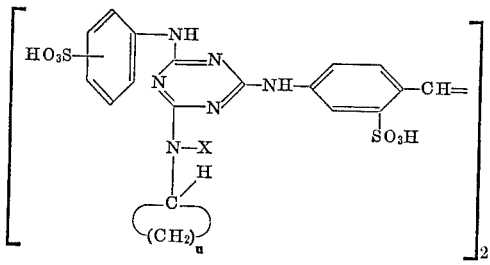

in which X is selected from the group consisting of:
(a) —(CH$_2$)$_n$—OH where $n$ has a value of 2 to 4, and (b)

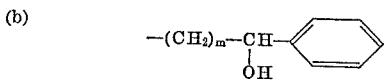

where $m$ has a value of 1 to 3, and $u$ has a value of 4 to 5.

2. A salt of the compound claimed in claim 1.

3. A compound having the formula:

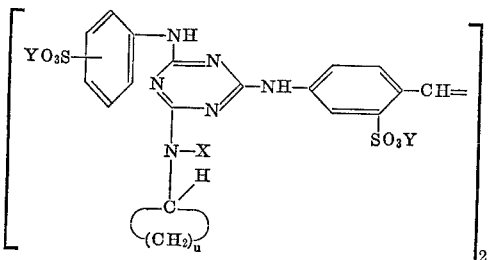

in which X is selected from the group consisting of:
(a) —(CH$_2$)$_n$—OH where $n$ has a value of 2 to 4, and
(b)

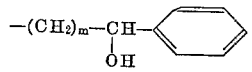

where $m$ has a value of 1 to 3, and
Y is selected from the group consisting of hydrogen, alkaline, and alkaline earth metal cations, and cations derived from ammonia and an alkanolamine of the formula:

$$(HO—R)_z—NR'_{3-z}$$

in which R is a alkane radical of 2 to 4 carbon atoms and in which
R' is selected from the group consisting of hydrogen, methyl, and ethyl, and in which
$z$ has a value of 1 to 3 and
$u$ has a value of 4 to 5.

4. Tetrasodium-4,4'-bis [4-[4-sulfoanilino]-6-[N-2-hydroxyethyl - N - cylohexyl - amino] - 1,3,5 - triazin-2-Yl]-amino-stilbene-2'-disulfonate.

5. Tetrasodium-4,4 - bis [4-[4 - sulfoanilino]-6-[2-hydroxy-2-phenylethyl-N-cyclohexyl-amino]-1,3,5 - triazin-2-Yl]-amino-stilbene-2,2'-disulfonate.

6. Tetrasodium-4,4 - bis [4-[4 - sulfoanilino]-6-[N-3-hydroxypropyl - N - cyclohexyl - amino]-1,3,5 - triazin-2-Yl]-amino-stilbene-2,2'-disulfonate.

7. Tetrasodium - 4,4'-bis{[<4-[4-sulfoanilino]-6-[N-4-hydroxybutyl-N-cyclohexyl-amino]-1,3,5 - triazin-2-Yl>]-amino-stilbene-2,2'-disulfonate.

8. Tetrasodium -4,4' - bis-{[<4-[4 - sulfoanilino]-6-[4-hydroxy - 4 - phenylbutyl - N - cyclohexyl-amino]-1,3,5-triazin-2-Yl>]amino}-stilbene-2,2'-disulfonate.

9. Tetrasodium - 4,4' - bis-{[<4-[4 - sulfoanilino]-6-[3-hydroxy-3-phenylpropyl - N - cyclohexyl-amino]-1,3,5-triazin-2-Yl>]amino}-stilbene-2,2'-disulfonate.

References Cited

UNITED STATES PATENTS 3,269,840   8/1966   Pattyn et al. _____ 260—240 B

FOREIGN PATENTS 227,270   5/1963   Austria.

OTHER REFERENCES

Conant, The Chemistry of Organic Compounds, pp. 470–71 (1939-Revised) Macmillan Co., N.Y.

HENRY R. JILES, *Primary Examiner.*

HARRY I. MOATZ, *Assistant Examiner.*

U.S. Cl. X.R.

252—300; 117—33.3; 260—563, 570.6